United States Patent [19]

Anflo et al.

[11] Patent Number: 4,935,744
[45] Date of Patent: Jun. 19, 1990

[54] COHERENT RADAR

[75] Inventors: Kjell S. Anflo, Hägersten; J. Werner Ingvar Grabs, Balsta, both of Sweden

[73] Assignee: U.S. Philips Corporation, New York, N.Y.

[21] Appl. No.: 335,915

[22] Filed: Apr. 10, 1989

[30] Foreign Application Priority Data

Apr. 14, 1988 [SE] Sweden .............................. 8801385

[51] Int. Cl.⁵ .............................................. G01S 7/28
[52] U.S. Cl. ..................................... 342/201; 342/202
[58] Field of Search ................................ 342/199–204

[56] References Cited

U.S. PATENT DOCUMENTS

| | | | |
|---|---|---|---|
| 2,586,028 | 2/1952 | Grayson et al. | 342/160 |
| 2,901,707 | 8/1959 | Kline et al. | 331/173 |
| 2,977,589 | 3/1961 | Gutton | 342/88 |
| 3,020,539 | 2/1962 | Gruenberg | 342/201 |
| 4,072,944 | 2/1978 | Bianco et al. | 342/16 |
| 4,079,378 | 3/1978 | Hulderman | 342/198 |
| 4,682,178 | 7/1987 | Anflo et al. | 342/202 |

Primary Examiner—Thomas H. Tarcza
Assistant Examiner—John B. Sotomayor
Attorney, Agent, or Firm—Robert J. Kraus

[57] ABSTRACT

The invention relates to a coherent radar comprising a magnetron (MAG), a modulator (MOD) for pulsing the magnetron, a stable local oscillator (STALO) and a mixer ($B_1$) for producing an intermediate frequency signal of incoming echoes and an intermediate frequency oscillator (MFO) and a phase sensitive detector (D) for detecting the echo pulses and producing a so called bipolar video signal. The modulator (MOD) and the intermediate frequency oscillator (MFO) are mutually time controlled in such manner that the front flank of the modulator pulse and thereby the magnetron pulse always appears in a predetermined phase position of the output signal of the intermediate frequency oscillator. According to the invention the oscillations of the magnetron are phase locked to an external signal in two steps. This is effected by applying a signal derived from the stable local oscillator to the tuning cavities of the magnetron before triggering. After triggering of the magnetron the supply of the signal is interrupted at a moment when the oscillations in the magnetron have started but not reached their final amplitude. Before the oscillations in the magnetron have reached their final amplitude, a signal of the transmission frequency of the magnetron is applied to the tuning cavities. The oscillations in the magnetron (MAG) are then phase locked to this signal, which is derived from a stable oscillator device (STALO, MFO, $B_2$).

7 Claims, 2 Drawing Sheets

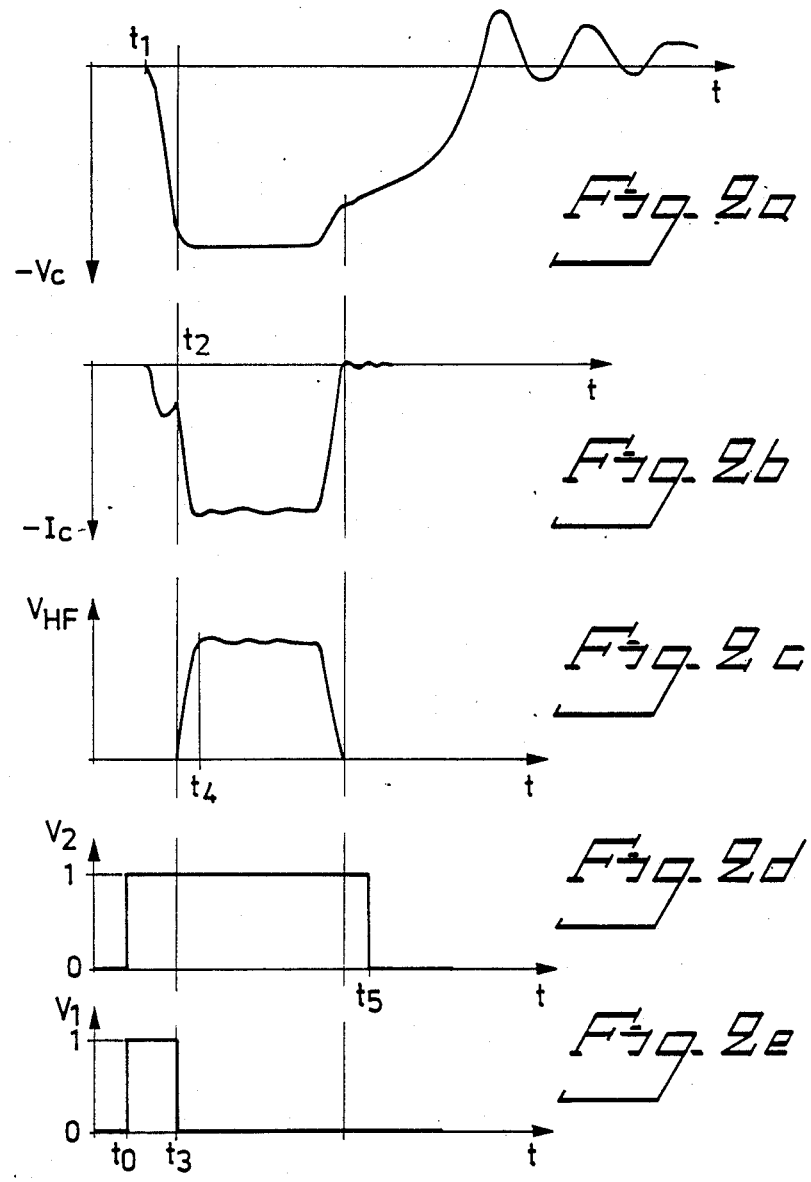

COHERENT RADAR

BACKGROUND OF THE INVENTION

The invention relates to a coherent radar comprising a magnetron, a modulator for driving the magnetron for the generation and transmission of HF-pulses, a stable local oscillator for producing an intermediate frequency signal of a frequency corresponding to the difference between the local oscillator frequency and the frequency of the transmitted pulses by mixing the local oscillator frequency with echo pulses caused by the transmitted pulses and an oscillator operating at intermediate frequency, the output signal of which is led, together with the intermediate frequency signal obtained by the mixing, to a phase sensitive detector for detecting the echo pulses and producing a signal, called bipolar video, inter alia containing information about the mutual phase position between the transmitted and received HF-signals. After a filtering operation the bipolar video signal can be used, both for unambiguous distances and for ambiguous distances, to separate targets having different radial speeds relative to the radar station, for example by suppressing echoes from fixed objects and only indicating movable targets.

When a magnetron is used as a HF-source in a coherent radar of this kind it is important that it can be made to deliver oscillations having a fixed phase relationship to the mixing product of the signal from the intermediate frequency oscillator and the signal from the stable local oscillator from pulse to pulse.

In a previously proposed solution of this problem, described in the Swedish patent SE 8400140-3, corresponding to U.S. Pat. No. 4,682,178 the modulator and the intermediate frequency oscillator are mutually time controlled in such manner that the front flank of the modulator pulse and thereby the magnetron pulse always appears in a predetermined phase position of the output signal of the intermediate frequency oscillator, and furthermore a phase stable signal, suitably derived from the already present stable local oscillator, is fed to the tuning cavities of the magnetron in an interval before triggering of the magnetron, so called priming. Such priming involves that a given quantity of oscillating energy is present in the cavities of the magnetron when the magnetron is triggered and starts to build-up own oscillations. This results in that the phase of these oscillations will be locked to the priming signal, which is derived from a continuously operating stable oscillator. Hereby phase continuity of the magnetron oscillations from pulse to pulse will be obtained.

A drawback for the solution according to the Swedish patent 8400140-3 is that the magnetron oscillations are not phase locked during the whole magnetron pulse but the phase can be subject to drift during the pulse itself. This can result in poor MTI-performance, in particular for extended magnetron pulses, while the MTI-performance for short pulses can be relatively good.

SUMMARY OF THE INVENTION

The object of the present invention is to modify a coherent radar of the kind as described in the opening paragraph, having priming control according to the Swedish patent 8400140-3, in such manner that it will have better MTI-performance both for short and extended radar pulses.

According to the invention this is achieved thereby, that the radar comprises means for varying the frequency of the said phase stable signal during the front flank of the magnetron pulse, the said frequency variation being such that the final frequency at the end of the front flank, which final frequency is also maintained during the magnetron pulse, corresponds to the transmission frequency of the magnetron.

Preferably the frequency variation is made stepwise in at least one step by means of a switching device. This will result in a simple device which is easy to control, for example on time basis.

The invention involves that phase locking to an external signal of the same frequency as the transmission frequency of the magnetron is made in at least two operation modes. In first hand the previously proposed priming control, which is interrupted when the oscillations in the magnetron have started but not reached their final amplitude, i.e. during the front flank of the magnetron pulse. In a final mode then the true phase locking to a signal of the same frequency as the transmission frequency of the magnetron takes place, which phase-lock signal is maintained during the magnetron pulse. Due to the fact that both the priming signal and the phase-lock signal are derived from continuously operating, stable oscillators the mutual phase relationship between the priming signal and the phase-lock signal will also be constant and the magnetron pulse will have phase continuity from pulse to pulse.

By the fact that the phase locking takes place in at least two modes the phase of the magnetron oscillations will be more constant during the whole magnetron pulse, i.e. both at the beginning of the pulse and at the end of extended magnetron pulses, as compared with the case when the phase locking takes place in one operation mode.

It is to be observed that phase locking of a magnetron to an external signal of the same frequency as the transmission frequency of the magnetron is previously known per se. The magnetron is then operating more like an amplifier than as a self oscillating device and in order to obtain an effective phase locking an appreciable power quantity of the external locking signal must be fed to the magnetron. In spite of this it will take a certain time at the beginning of the magnetron pulse before the phase of the generated oscillations is stable. In this case the MTI-performance can be relatively good for extended magnetron pulses, while the MTI-performance for short pulses will be poor.

If the frequency variation is effected as one single stepwise variation by switching between two signals of different frequencies; a first signal of a first frequency fed to the magnetron before the magnetron is triggered, and a second signal of a second frequency equal to the final frequency, which is supplied during the front flank of the magnetron pulse before the magnetron oscillations have reached their full amplitude, a maximally simple device will be obtained if both frequencies according to a preferred embodiment of the invention are derived from the already present phase stable oscillators, namely the stable local oscillator and the intermediate frequency oscillator.

Suitably the signal of the second frequency or the final frequency can be generated by a mixer, in which the output signal of the local oscillator is mixed with the output signal of the intermediate frequency oscillator, while the signal of the first frequency is formed by the output signal from the local oscillator itself. Then the difference between the two frequencies fed to the tuning cavities of the magnetron during the front flank of the magnetron pulse will be equal to the intermediate frequency in the system.

In an alternative embodiment the signal of the first frequency can also be generated by a mixer. In this mixer a signal derived from the local oscillator is mixed with a signal derived from the intermediate frequency oscillator via a converting stage, for example a frequency divider. Then the difference between the two frequencies fed to the tuning cavities of the magnetron during the front flank of the magnetron pulse will deviate from the intermediate frequency.

Simple and accurate control of the switching device is obtained if the control is effected by the modulator or a control device for the modulator, if desired via a time delay, so that the activation of the switching device will have a given time relationship to the triggering moment of the magnetron.

BRIEF DESCRIPTION OF THE DRAWING

The invention is illustrated by means of example with reference to the accompanying drawing figures, in whch:

FIG. 2 shows some time diagrams for explaining the invention; and

DESCRIPTION OF THE PREFERRED EMBODIMENTS

Figure 1:
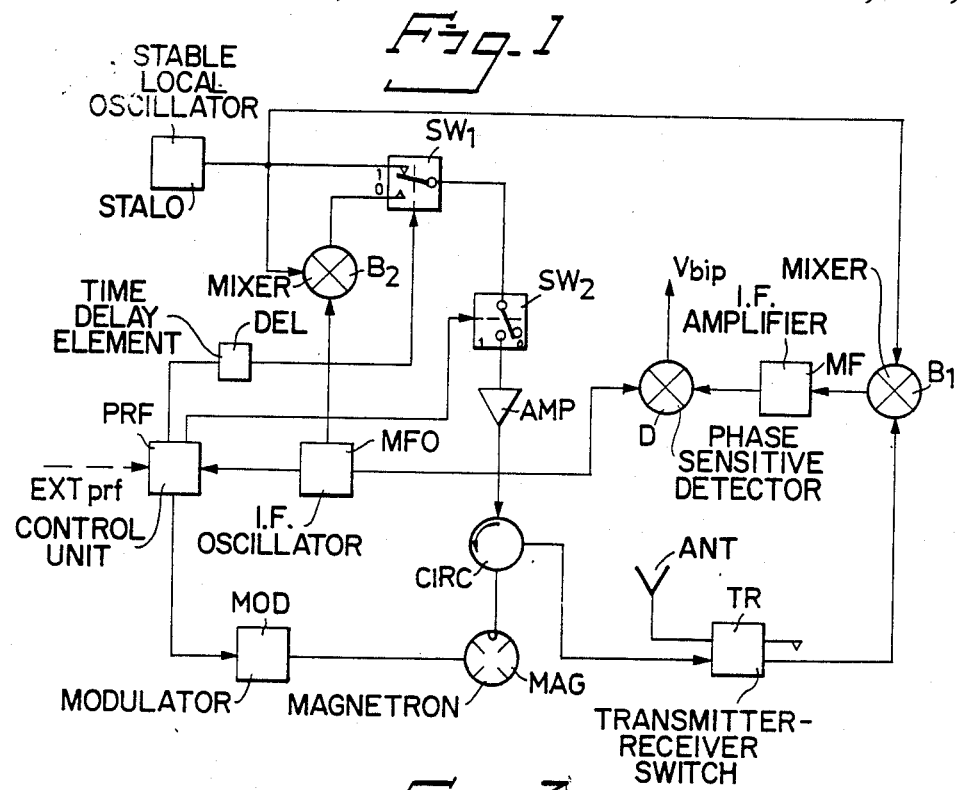
FIG. 1 shows a block diagram for a radar with a magnetron as HF-source according to the invention.

In the radar apparatus of FIG. 1, a magnetron MAG is driven with short voltage pulses from a modulator MOD and the generated HF-pulses are led via a circulator CIRC and a Transmitter-Receiver switch TR to an antenna ANT for the transmission of the pulses. Echo pulses from a reflecting object, caused by the transmitted radar pulses, are received with the same antenna ANT and are led via the Transmitter-Receiver switch TR to a mixer $B_1$, where they are combined with the output signal from a stable local oscillator STALO. The magnetron is adjusted to a fixed transmission frequency, for example by means of a mechanical locking device or by means of a stepping motor. The transmission frequency $f_{MAG}$ of the magnetron then differs by a quantity equal to the selected nominal intermediate frequency $f_{MFO}$ from the stable local oscillator frequency $f_{STALO}$. Echo pulses at an intermediate frequency $f_{MF}$ having the said nominal value $f_{MFO}$ are then obtained from the mixer $B_1$. The intermediate frequency signal is amplified in an intermediate frequency amplifier MF and is then led to a phase sensitive detector D, which also receives the output signal from a continuously operating oscillator MFO. This oscillator operates at a frequency equal to the selected nominal intermediate frequency $f_{MFO}$ and from the phase detector D a signal $V_{bip}$ is obtained, which is called bipolar video because it can assume both a positive and a negative value. The bipolar video signal represents, besides the strength of the echo signal, also the mutual phase position between transmitted and received HF-signals. If the distance between the radar equipment and the reflecting object varies with time the bipolar video signal $V_{bip}$ will vary with a frequency depending upon the distance variation, namely such that the signal will run through a 360° sequence for each half wavelength of distance variation to the reflecting object. The bipolar signal is then subject to a filtering operation, for example in a MTI-filter which in principle is a high pass filter, for suppressing echoes from fixed objects, or for speed separation at an ambiguous distance.

In order to ensure that the bipolar video signal $V_{bip}$ actually will represent the mutual phase position between the transmitted and received signals the following steps are taken.

In first hand the oscillations of the magnetron are phase locked to a stable signal derived from the two stable oscillators STALO and MFO, more closely to a signal obtained from a mixer $B_2$ to which the output signals of the said two oscillators are fed. This signal from the mixer $B_2$ is fed to the tuning cavities of the magnetron via a first switch $SW_1$ of make-and-brake type, a second switch $SW_2$ possibly an amplifier AMP, and the circulator CIRC. The switch $SW_2$ is controlled from a control unit PRF of the modulator MOD in such manner that it is normally open but will be closed just before the moment, when the magnetron is triggered, and it is then kept closed during the magnetron pulse. The phase locking is effected in two steps such that, before the triggering of the magnetron and during a first part of the build-up phase of the magnetron pulse, instead of the output signal from the mixer $B_2$, the output signal from the stable local oscillator STALO alone is fed to the tuning cavities of the magnetron. Switching between the two signals is effected by means of the switch $SW_1$ which in a first position 1 conveys the output signal from the oscillator STALO to the tuning cavities of the mangetron and in a second position 0 conveys the output signal from the mixer $B_2$ to the cavities. The switch $SW_1$ is controlled from the control unit PRF of the modulator, possibly via a time delay element DEL, in such manner that before triggering of the magnetron it assumes the first position 1 and is set to the second position 0 when the oscillations in the magnetron have started but not yet reached their final amplitude, i.e. during the front flank of the magnetron pulse.

The modulator MOD is time controlled from the intermediate frequency oscillator MFO via the control device PRF in such manner that the front flank of the modulator pulse always coincides with a given phase position of the output signal of the intermediate frequency oscillator MFO, for example a zero transition in a given direction.

In an example with internal generation of the pulse repetition frequency PRF the control device PRF can consist of a counter for counting the number of positive or negative zero transitions in the output signal of the intermediate frequency oscillator and cuasing each nth zero transition to start the modulator. Alternatively the pulse repetition frequency prf can be generated externally, as is shown in FIG. 1 by the dashed line control conductor $EXT_{prf}$ to the control device PRF. In this case the control device PRF can comprise an AND-gate receiving at one of its inputs the signal from the external prf-generator via the control conductor $EXT_{prf}$. At a second input the gate can receive pulses representing zero transitions in the output signal of the intermediate frequency oscillator. The modulator and thereby the magnetron will then be started at the first zero transition in the given direction after reception of prf-signal from the external generator.

The function is that in the interval immediately before the triggering of the magnetron a small portion of the output signal of the stable local oscillator STALO is fed to the cavities of the magnetron. Thus, when the magnetron is triggered a small quantity of oscillating energy of the frequency of the stable oscillator is present in the cavities of the magnetron. According to the foregoing this frequency can be written $f_{STALO}=f_{MAG}-f_{MFO}$ where $f_{MAG}$ is the transmission frequency of the magnetron and $f_{STALO}$ and $F_{MFO}$ are the frequencies of the two stable oscillators STALO and MFO.

This oscillating energy, which has phase continuity from pulse to pulse because it is derived from a continuously operating stable oscillator, influences the phase of the self-oscillations which are built-up in the magnetron at the triggering of the same. When the oscillations have reached a certain, relatively small amplitude the supply of energy of the said oscillator frequency $f_{STALO}$ is interrupted and instead the mixing product from the mixer $B_2$ is fed to the cavities of the magnetron. One of the mixing products from the mixer $B_2$ is:

$$f_{STALO}+f_{MFO}=f_{MAG}.$$

The oscillations of the magnetron, which are already phase controlled by means of an external signal, are now phase locked to this signal of the frequency $f_{MAG}$. Also the mixing product of the frequency $f_{MAG}$ has phase continuity from pulse to pulse, because it is derived from two continuously operating stable oscillators. By the phase locking in two steps the phase, as seen over the whole magnetron pulse, will be more constant than if it had been made in only one step.

The function is illustrated by means of the time diagrams in FIG. 2, where (a) shows the voltage $V_c$ from the modulator, which at the same time represents the cathode voltage of the magnetron as function of the time t, (b) shows the cathode current $I_C$ as function of time, (c) shows the envelope of the HF-voltage $V_{HF}$, i.e. the generated magnetron pulse, FIG. 2(d) shows a control pulse $V_2$ fed to the switch $SW_2$ and (e) shows a control pulse $V_1$ fed to the switch $SW_1$. In FIG. 2 (d) the level 0 indicates that the switch $SW_2$ assumes position 0, where it is open, and the level 1 that the switch assumes position 1 where it is closed. In FIG. 2(e) the level 0 indicates that the switch $SW_1$ is set in the position 0, where the output signal of the mixer $B_2$ is led to the cavities of the magnetron, and the level 1 that the switch $SW_1$ is set in the position 1, where the output signal of the local oscillator STALO is led to the magnetron.

At the moment $t_1$ the voltage pulse $V_c$ delivered by the modulator MOD to the cathode of the magnetron begins and the cathode voltage increases rapidly towards its final value. During the time interval $t_1$ to $t_2$ charging of the inner capacitances of the magnetron takes place. At the time moment $t_2$ immediately before the cathode voltage has reached its final value the magnetron will begin to generate HF-oscillations. At the moment $t_0$ lying before the moment $t_1$ both switches $SW_2$ and $SW_1$ are in the given example set in the position 1. This means that in the interval before the triggering of the magnetron the output signal from the local oscillator STALO is fed to the cavities of the magnetron. At the time moment $t_3$ the switch $SW_1$ is set back to the position 0, which means that the supply of the output signal of the local oscillator to the cavities of the magnetron is interrupted and that instead the output signal of the mixer $B_2$ is fed to the magnetron. The time moment $t_3$ must appear after the time moment $t_2$ when the magnetron starts. The time moment $t_3$ must furthermore appear before the time moment $t_4$ when the HF-oscillations have reached their final amplitude. In the given example the time moment $t_3$ is very close to the moment $t_2$, which is advantageous for the phase locking taking place by injecting the output signal of the mixer $B_2$ into the cavities of the magnetron in the moment $t_3$. The time moment $t_0$ must appear before the time moment $t_2$ and should for example not be later than the time moment $t_1$. At the time moment $t_5$ the switch $SW_2$ is reset to the position 0 and the injection of the phase locking signal is interrupted. The time moment $t_5$ appears after the moment when the magnetron pulse has ceased, which means that injection of phase locking signal is maintained during the whole magnetron pulse.

Figure 3:
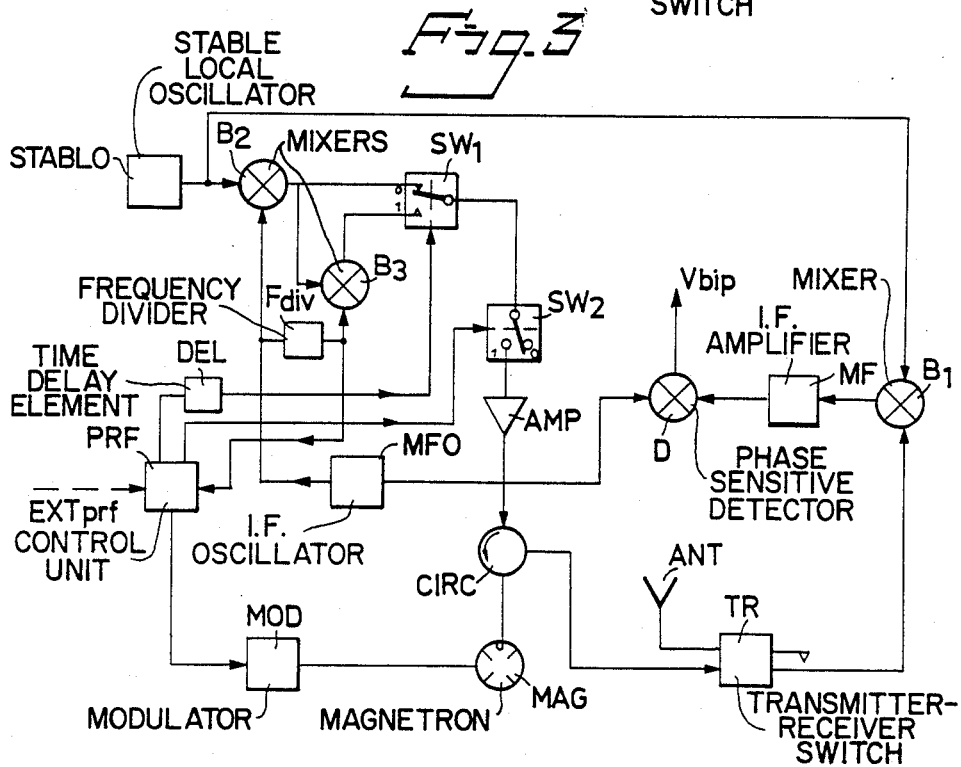
FIG. 3 shows a second embodiment of the invention.

FIG. 3 shows an example of a circuit, in which the frequency difference between the transmitted frequency and the frequency supplied to the magnetron in the starting moment is not the same as the intermediate frequency in the system.

In the same manner as in the first embodiment a signal of the transmission frequency is obtained thereby that the output signal from the stable oscillator STALO is mixed in a mixer $B_2$ with the output signal from the intermediate frequency oscillator MFO. The oscillator STALO is tuned to the difference between the transmission frequency of the magnetron and the frequency of the intermediate frequency oscillator MFO and a mixing product from $B_2$ then will have the transmission frequency of the magnetron, which is led to the magnetron in the position 0 of the switch $SW_1$. This takes place immediately before the moment when the magnetron pulse has reached its final amplitude. The signal fed to the magnetron in the starting moment is in the example according to FIG. 3 obtained from a mixer $B_3$, where the signal from the mixer $B_2$ is mixed with a signal of suitable frequency derived from the oscillator MFO via a frequency divider $F_{div}$. The output signal from the frequency divider $F_{div}$ is in the shown example also used to control the control unit PRF. For correct function of this system the phase difference between the signal from the oscillator MFO and the signal from the frequency divider $F_{div}$ must be equal from pulse to pulse when the modulator MOD is triggered. This can be ensured in a simple manner if division with an integer is used in the frequency divider $F_{div}$, but other divisional factors are also possible. However, the modulator cannot be triggered at any selected zero transition in the output signal from the frequency divider $F_{div}$.

Instead of controlling the switch $SW_2$ on time basis by means of signal from the modulator or a control unit for the same the activation of the switch $SW_2$ can alternatively be effected on basis of a measurement of a magnetron value, as cathode voltage, cathode current or HF-envelope. Phase locking can also be effected in more than two steps or by using a frequency sweep during the front flank of the magnetron pulse. The transmission frequency of the magnetron can deviate somewhat from the final frequency of the injected locking signal provided that it is kept within the so called locking bandwidth relative to the injection frequency. The allowable deviation between the injection frequency and the own frequency of the magnetron is normally less than 1%.

We claim:

1. In a coherent radar apparatus comprising:
   a. a magnetron for producing HF pulses;
   b. a modulator for driving the magnetron to produce said pulses;

c. a local oscillator for producing a first frequency signal;

d. an antenna for transmitting the HF pulses and receiving reflected echo pulses;

e. a first mixer coupled to the first oscillator and to the antenna for mixing the first frequency signal and the echo pulses to produce a first intermediate frequency signal;

f. an intermediate frequency oscillator for producing a second intermediate frequency signal;

g. a phase sensitive detector coupled to the first mixer and to the intermediate frequency oscillator for detecting the echo pulses and producing a phase information signal representative of the relative phases of the transmitted HF pulses and the received echo pulses;

h. control means coupled to the modulator and to the intermediate frequency oscillator for controlling initiation of the HF pulses such that said pulses have a predetermined phase relationship with the second intermediate frequency signal;

the improvement comprising means for phase locking the magnetron oscillations during each HF pulse, said phase locking means supplying to the magnetron a controlled frequency signal having a frequency which is varied from a first frequency during initiation of each HF pulse to a second frequency during the remainder of each HF pulse, said second frequency substantially corresponding to the operating frequency of the magnetron and effecting stabilization of said operating frequency.

2. A coherent radar apparatus as in claim 1 where said phase locking means includes means for producing a first stable oscillating signal having the first frequency, means for producing a second stable oscillating signal having the second frequency, and switching means for successively applying said first and second stable oscillating signals to the magnetron.

3. A coherent radar apparatus as in claim 2 where the first and second stable oscillating signals are derived from the first frequency signal and the second intermediate frequency signal.

4. A coherent radar apparatus as in claim 3 where the means for producing the second stable oscillating signal comprises a second mixer having respective inputs coupled to the local oscillator and to the intermediate frequency oscillator.

5. A coherent radar apparatus as in claim 3 or 4 where the means for producing the first stable oscillating signal comprises the local oscillator.

6. A coherent radar apparatus as in claim 3 where the means for producing the first stable oscillating signal comprises a second mixer having respective inputs coupled to the local oscillator and to the intermediate frequency oscillator, and where the means for producing the second stable oscillating signal comprises a third mixer having a first input coupled to an output of the second mixer and having a second input coupled to the intermediate frequency oscillator through frequency divider means.

7. A coherent radar apparatus as in claim 2 where the switching means is coupled to the control means.

* * * * *